US009243482B2

(12) United States Patent
Rop

(10) Patent No.: US 9,243,482 B2
(45) Date of Patent: Jan. 26, 2016

(54) STEAM SUPPLY FOR ENHANCED OIL RECOVERY

(71) Applicant: Peter Simon Rop, Zoetermeer (NL)

(72) Inventor: Peter Simon Rop, Zoetermeer (NL)

(73) Assignee: NEM ENERGY B.V., Zoeterwoude (NL)

( * ) Notice: Subject to any disclaimer, the term of this patent is extended or adjusted under 35 U.S.C. 154(b) by 462 days.

(21) Appl. No.: 13/649,506

(22) Filed: Oct. 11, 2012

(65) Prior Publication Data

US 2013/0105151 A1    May 2, 2013

Related U.S. Application Data

(60) Provisional application No. 61/554,046, filed on Nov. 1, 2011.

(51) Int. Cl.
| | | |
|---|---|---|
| C02F 1/04 | (2006.01) | |
| C02F 1/16 | (2006.01) | |
| E21B 43/24 | (2006.01) | |
| F28F 13/06 | (2006.01) | |
| F22B 37/00 | (2006.01) | |

(Continued)

(52) U.S. Cl.
CPC ............. *E21B 43/24* (2013.01); *C02F 1/043* (2013.01); *C02F 1/045* (2013.01); *C02F 1/14* (2013.01); *C02F 1/16* (2013.01); *E21B 43/2406* (2013.01); *F28F 13/06* (2013.01); *F28F 27/00* (2013.01); *C02F 2209/005* (2013.01); *C02F 2209/40* (2013.01)

(58) Field of Classification Search
CPC .............. C02F 1/02; C02F 1/04; C02F 1/043; C02F 1/045; C02F 1/048; C02F 1/16; C02F 2209/02; C02F 2209/005; C02F 2209/40; C02F 1/14; E21B 43/24; E21B 43/2406; E21B 43/2408; E21B 21/06; E21B 21/063; E21B 21/10; F22B 37/00; F28F 13/00; F28F 13/06; F28F 27/00; F28F 2221/00; F28F 2221/02; F28F 2250/00; F28F 2250/04; F28F 2250/06
USPC ............. 210/149, 175, 180–182, 96.1, 257.1, 210/194–197; 159/23, 24.2, 31; 166/267, 166/272.1, 272.3, 263, 303; 165/108, 132
See application file for complete search history.

(56) References Cited

U.S. PATENT DOCUMENTS

| | | | | |
|---|---|---|---|---|
| 2,786,543 A | * | 3/1957 | Hayes et al. | ..................... 96/184 |
| 3,298,359 A | * | 1/1967 | West et al. | ..................... 122/379 |
| 3,353,593 A | * | 11/1967 | Boberg | ..................... 166/252.1 |

(Continued)

FOREIGN PATENT DOCUMENTS

| | | |
|---|---|---|
| WO | 2007033371 A2 | 3/2007 |
| WO | 2010132849 A2 | 11/2010 |

*Primary Examiner* — Joseph Drodge

(57) ABSTRACT

A steam supply apparatus (1) for enhanced oil recovery from an oil field (10). The steam supply apparatus includes a water circulating portion (50) providing a continuous flow of water to a water heater (4) for the production of a mixture of steam and water, and a separator (5) for directing the steam to the oil field. Water returned from the oil field is purified in a water treatment apparatus (3) to provide make-up water to the water circulating portion. A buffer volume (3*b*) is provided in fluid communication between the water treatment apparatus and the water circulating portion. The buffer is sized to provide a time lag between a degradation of the quality of the purified water and an occurrence of an unacceptable scale production in the water heater, thereby allowing continued safe system operation until the water quality problem is corrected.

15 Claims, 2 Drawing Sheets

(51) Int. Cl.
 *F28F 27/00* (2006.01)
 *C02F 1/14* (2006.01)

(56) References Cited

U.S. PATENT DOCUMENTS

| | | | | |
|---|---|---|---|---|
| 4,174,752 | A | | 11/1979 | Slater et al. |
| 4,249,605 | A | | 2/1981 | Slater et al. |
| 4,252,107 | A | | 2/1981 | Horton |
| 4,289,204 | A | | 9/1981 | Stewart |
| 4,296,739 | A | | 10/1981 | Bolding |
| 4,398,603 | A | * | 8/1983 | Rodwell ............ 166/267 |
| 4,481,109 | A | | 11/1984 | Stewart |
| 5,058,675 | A | | 10/1991 | Travis |
| 6,536,523 | B1 | * | 3/2003 | Kresnyak et al. ........ 166/266 |
| 7,337,843 | B2 | | 3/2008 | Mecham et al. |
| 7,842,121 | B2 | * | 11/2010 | Sanderson et al. ............ 95/1 |
| 8,167,041 | B2 | | 5/2012 | Chiesa et al. |
| 8,261,832 | B2 | | 9/2012 | Ryan |
| 8,267,185 | B2 | | 9/2012 | Ocampos et al. |
| 8,469,091 | B2 | * | 6/2013 | Bjorklund et al. ........... 166/266 |
| 8,701,773 | B2 | * | 4/2014 | O'Donnell et al. ........... 166/303 |
| 2003/0173081 | A1 | * | 9/2003 | Vinegar et al. ............ 166/272.1 |
| 2005/0279500 | A1 | | 12/2005 | Heins |
| 2008/0110630 | A1 | * | 5/2008 | Minnich et al. ............. 166/303 |
| 2008/0135254 | A1 | * | 6/2008 | Vinegar et al. ............. 166/303 |
| 2008/0190607 | A1 | * | 8/2008 | Minnich et al. ............. 166/267 |
| 2009/0056945 | A1 | * | 3/2009 | Minnich et al. ............. 166/272.3 |
| 2010/0000733 | A1 | | 1/2010 | Chiesa et al. |
| 2010/0147516 | A1 | * | 6/2010 | Betzer-Zilevitch ........ 166/272.6 |
| 2010/0200231 | A1 | | 8/2010 | Minnich |
| 2012/0048715 | A1 | * | 3/2012 | James ........................ 203/14 |
| 2012/0087737 | A1 | * | 4/2012 | Minnich et al. ........... 405/129.2 |

\* cited by examiner

STEAM SUPPLY FOR ENHANCED OIL RECOVERY

FIELD OF THE INVENTION

This invention relates generally to the field of oil well production, and more particularly, to a steam supply for enhanced oil recovery using thermal stimulation of oil reserves.

BACKGROUND OF THE INVENTION

Various enhanced oil recovery techniques are known for increasing the production of heavy crude oil, including gas injection, chemical injection, microbial injection and thermal recovery. Thermal recovery methods involve the introduction of a heated fluid, such as steam, into an oil field in order to decrease the viscosity of the oil and thus to facilitate its removal.

U.S. Pat. No. 5,058,675 discloses a method and apparatus for the extraction of oil and gas from oil shale wherein solar-heated steam is injected into a well in an open system wherein there is no water recovery from the well. Such systems consume a large quantity of water and are not practical for all applications.

The recovery and reuse of water for a steam injection enhanced oil recovery system requires the removal of minerals from the recovered water prior to reuse as feed water for a boiler, since such minerals will concentrate in the boiler and cause an unacceptable scale buildup which inhibits heat transfer and necessitates periodic cleaning operations. U.S. Pat. No. 8,167,041 discloses a method for the recovery of hydrocarbon from oil sands which avoids such scaling problems. A solar thermal power plant is used to generate steam. The steam in injected via an injection well into a formation in the ground to extract bitumen at an oil producing well. FIG. 7 of that patent shows a solar heating system which has a first closed circuit of a heat transfer fluid. A heat exchange unit (steam generator) is provided to exchange heat from the heat transfer fluid to a water steam mixture in a second circuit. Steam is produced in the second circuit which is injected into the ground formation via the injection well. Produced water from the formation is separated from the extracted oil and recirculated in the second circuit. The first circuit utilizes a clean heat transfer fluid, which may be clean water, to prevent scaling of the solar collection panels. The second circuit uses a relatively dirty water steam mixture. The water returned from the formation includes oil residuals and minerals which would cause scaling of the heat transfer surfaces of the solar collector if this dirty water were directly supplied to the solar field.

BRIEF DESCRIPTION OF THE DRAWINGS

The invention is explained in the following description in view of the drawings that show.

DETAILED DESCRIPTION OF THE INVENTION

The present inventor has recognized that the efficiency of systems such as those disclosed in U.S. Pat. No. 8,167,041 is reduced as a result of the necessity of heat exchange between the first and second fluid circuits. Thermal losses occur due to the transfer of heat via the first heat transfer fluid to the water steam mixture. A further limitation of such systems is that the heat exchange unit requires a start up time to reach an operational temperature. This start up time shortens the available operational time of the solar field. A further disadvantage is the cost of the necessary heat exchange unit. Accordingly, it is an object of the present invention to provide a steam supply for enhanced oil recovery wherein efficiency is increased while scale formation is controlled. It is also an object to provide a system with reduced start-up time and increased available operational time when compared to prior art closed loop systems.

Accordingly, embodiments of a steam supply for enhanced oil recovery are disclosed herein which include the direct heating of water by a heat source, such as a solar mirror field, for the generation of steam for injection into a ground formation, and the recovery and purification of water from the ground formation for reuse in the system. Because the quality of the purified water is directly related to the potential production of scale in the water heater, that quality is monitored in some embodiments to ensure the proper functioning of the water treatment apparatus, and a volume buffer of the purified water is provided between the water treatment apparatus and the heater such that continued operation of the system may continue for a time period after the detection of an unacceptable water quality without the risk of unacceptable scale formation in the heater.

Figure 1:
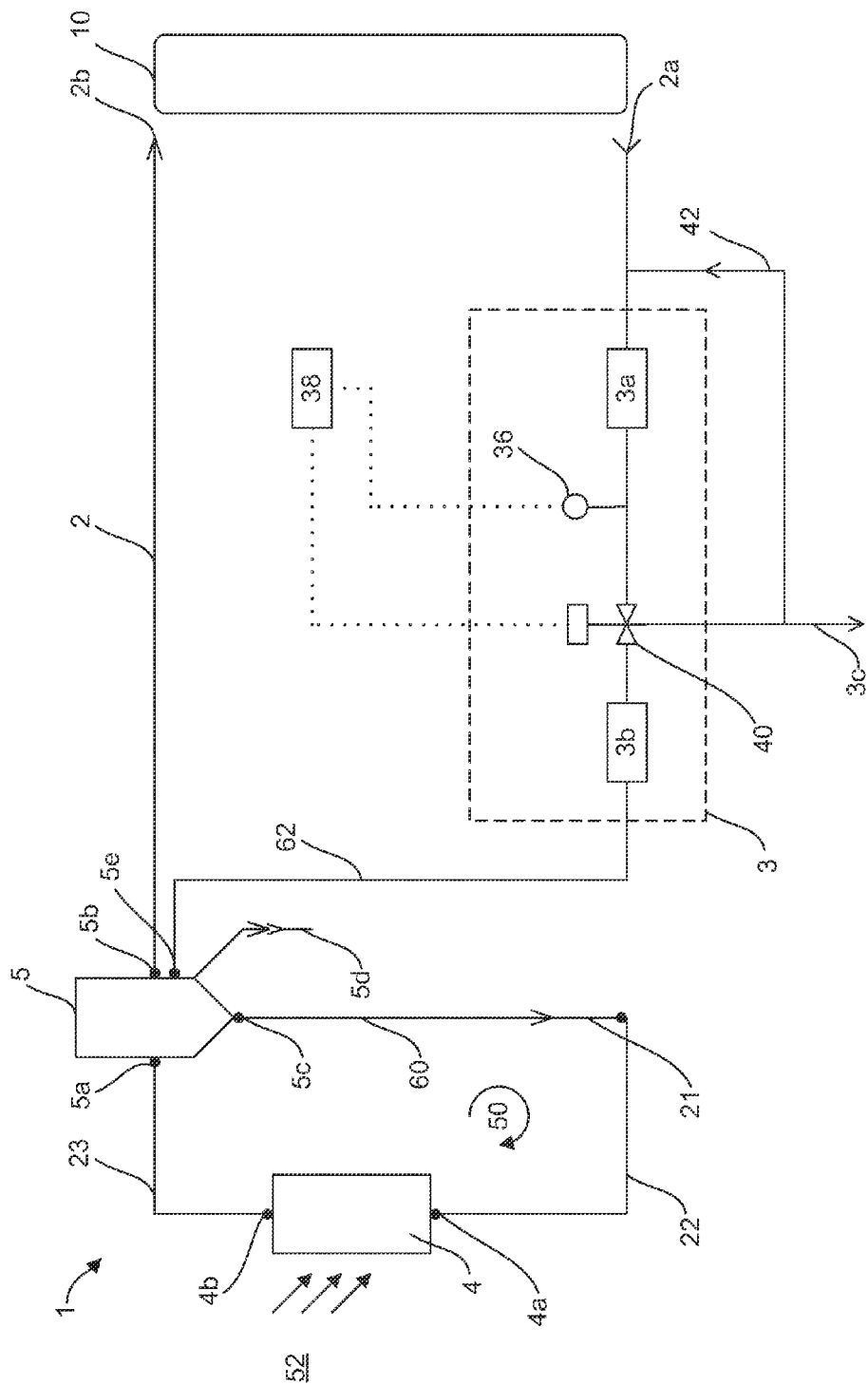
FIG. 1 is a schematic illustration of a steam supply apparatus according to an embodiment of the invention.

FIG. 1 is a schematic illustration of an embodiment of a steam supply apparatus 1 according to aspects of the invention. The steam supply apparatus is described herein as a solar plant 1 which uses solar energy to generate steam, but one skilled in the art will recognize that other embodiments of the invention may utilize other sources of heat, such as but not limited to the combustion of oil or gas, or waste heat from a process or turbine, etc. The solar plant 1 includes a circuit 2. The circuit 2 is a single continuous circuit for conducting a water steam mixture from and to an object such as an oil field 10. The circuit 2 has a water inlet 2a for feeding water to the circuit 2 and a steam outlet 2b for discharging steam to the oil field 10. Steam is discharged to the oilfield and water is gained from the oilfield. The water at the water inlet 2a originates from the oil field 10 and is recycled in the circuit 2. The water is cleaned from yielded oil and other contaminants and is supplied to the circuit 2.

At the water inlet 2a, the water from the oil field 10 is supplied to a water treatment apparatus such as purification facility 3. The water purification facility 3 includes a purification device 3a and may include an integral or self-standing water buffer volume 3b as described further below. In the water purification facility 3, the water is cleaned by the purification device 3a from contaminations like minerals and oil residuals. The purified water from the purification device 3a is buffered in the water buffer volume 3b before it is further conducted in the circuit 2 and supplied to a water heater such as solar heat system 4.

The water buffer 3b has a storage space of a predetermined volume, a water buffer inlet 32 for supplying water to the storage space and a water buffer outlet 34 for discharging water from the storage space. A water quality monitor 36 is provided to monitor the quality of the purified water being supplied from the water treatment apparatus 3 to the solar heat system 4. The water quality monitor 36 may be any known type of monitor, such as a conductivity meter, pH meter, or laboratory testing such as for silica or other contaminants. If the monitoring means is an online system, it may be connected to a control unit 38 and are arranged to measure real-time the quality of the supplied purified water and to control operation of the water circulating portion of the system responsive to the quality of the purified water. The water buffer inlet may be provided with a valve 40 controlled by the control unit 38 in response to the water quality measurement to shut off or to redirect the water supply in the event that the supplied water has too high a degree of contamination as a result of a malfunction of the purification device 3a. The redirected water can be drained away by a drain conduit 3c to leave the circuit 2 or optionally returned to the inlet of the purification device 3a by recycle line 42. In another embodiment, the control unit 38 may terminate operation of the water heater, such as by repositioning mirrors of the solar collection system, if the purified water quality is below a threshold for a predetermined time interval.

In the event of a water treatment system malfunction or other interruption of the supply of purified water from the water treatment apparatus, the water steam circuit 2 can still be fed with clean water from the water buffer 3b, which allows the solar water heater 4 to remain in operation and for steam injection to the oil field 10 to continue for a time period without the problem of unacceptable scale deposition in the heater. A desired time lag enabled by the water buffer volume can be predetermined during the design of the steam supply apparatus 1 and a necessary volume of the buffer calculated based upon a rated capacity (design flow rate) of the water treatment apparatus—i.e. rated capacity (volume/time) multiplied by the predetermined time lag desired (time) equals required buffer volume (volume). In one embodiment, the buffer volume may be at least equal to one hour of water production by the water treatment apparatus at its rated capacity. During the time lag between an instance of an unacceptable degradation of the quality of the purified water and an occurrence of an unacceptable scale production in the water heater, an operator has an opportunity to repair the malfunction of the purification device. Furthermore, the water heater is isolated by the buffer from minor short duration water quality perturbations, which typically might go undetected in prior art systems and which do not require a corrective action even if they are detected due to their transient nature. Such short duration transients are diluted in the buffer volume and the water heater is thereby not exposed to unacceptable water quality. Due to the available water buffer 3b in the water purification facility 3 of the solar plant, it is possible to operate the solar plant with a higher degree of clean water over a long time. By preventing incidental contamination of the water steam mixture, the amount of cleaning operations can be reduced and scaling of evaporators can be prevented.

The circuit 2 has a circulating part 50 which is indicated by an arrow in FIG. 1. The circulating part includes the solar heat system 4 and a water/steam separator 5. The solar heat system 4 is a heat system in which solar radiation 52 is used to heat a supplied flow medium. Here, the flow medium is a water steam mixture.

The solar heat system 4 may be a solar field which includes a field of mirrors, so called heliostats, and a solar tower (not shown). Sunlight is reflected by the heliostats and focused to one point on the solar tower. The solar tower includes an evaporator having at least one receiver panel to evaporate supplied water partially into steam. The receiver panel of the solar tower may have a heat intensity of about 600 kW/m$^2$. The receiver panel may include a set of upwardly directed heat transfer tubes receiving water from a water inlet 4a. A water steam mixture leaves the evaporator of the solar heat system 4 via a heat system outlet 4b and is conducted to the separator 5.

The separator 5 is arranged to separate water from steam in the supplied water steam mixture. The separator has a water steam inlet 5a which is in fluid communication with the heat system outlet 4b for receiving the water steam mixture from the solar heat system. The separator 5 has a separator steam outlet 5b which is in fluid communication with a steam outlet 2b of the circuit 2, from which the steam is injected in the oil field 10. The separator 5 further has a blowdown conduit 5d for draining flow medium to a water dump, normally to limit the concentration of contaminants in the circulating part 50. The separator 5 also has a separator water outlet 5c for discharging separated water. The separator water outlet 5c is connected to a recirculation conduit 21. The recirculation conduit 21 is via an extension conduit 22 in fluid communication with the heat system inlet 4a and returns the separated water back to the solar heat system 4. Thus, the heat system is fed with water from a water circulating portion of the apparatus 1 which originates from the separator 5, which is a first water flow 60, and from a water treatment portion of the apparatus 1, the water buffer 3b, which is a second water flow 62. Due to the circulating part of the circuit, the solar heat system 4 is of a circulating type instead of a once through type. The solar heat system is of a single pass type instead of a multi pass type, which means that the flow medium passes during a passage through the evaporator 4 of the solar heat system in a single step through the heat source. The water circulates through the solar heat system until the water is converted into steam. The mass flow rate of water flow 60 originating from the separator 5 is higher than the mass flow rate of water flow 62 originating from the water buffer 3b of the purification facility. In particular, the mass flow rate of water 60 originating from the separator 5 to the water heater may be a factor ten times higher than the mass flow rate of water 62 originating from the water buffer 3b, or at least five times in another embodiment. The large mass flow of water through the solar heat system advantageously prevents scaling of the evaporator.

Figure 2:
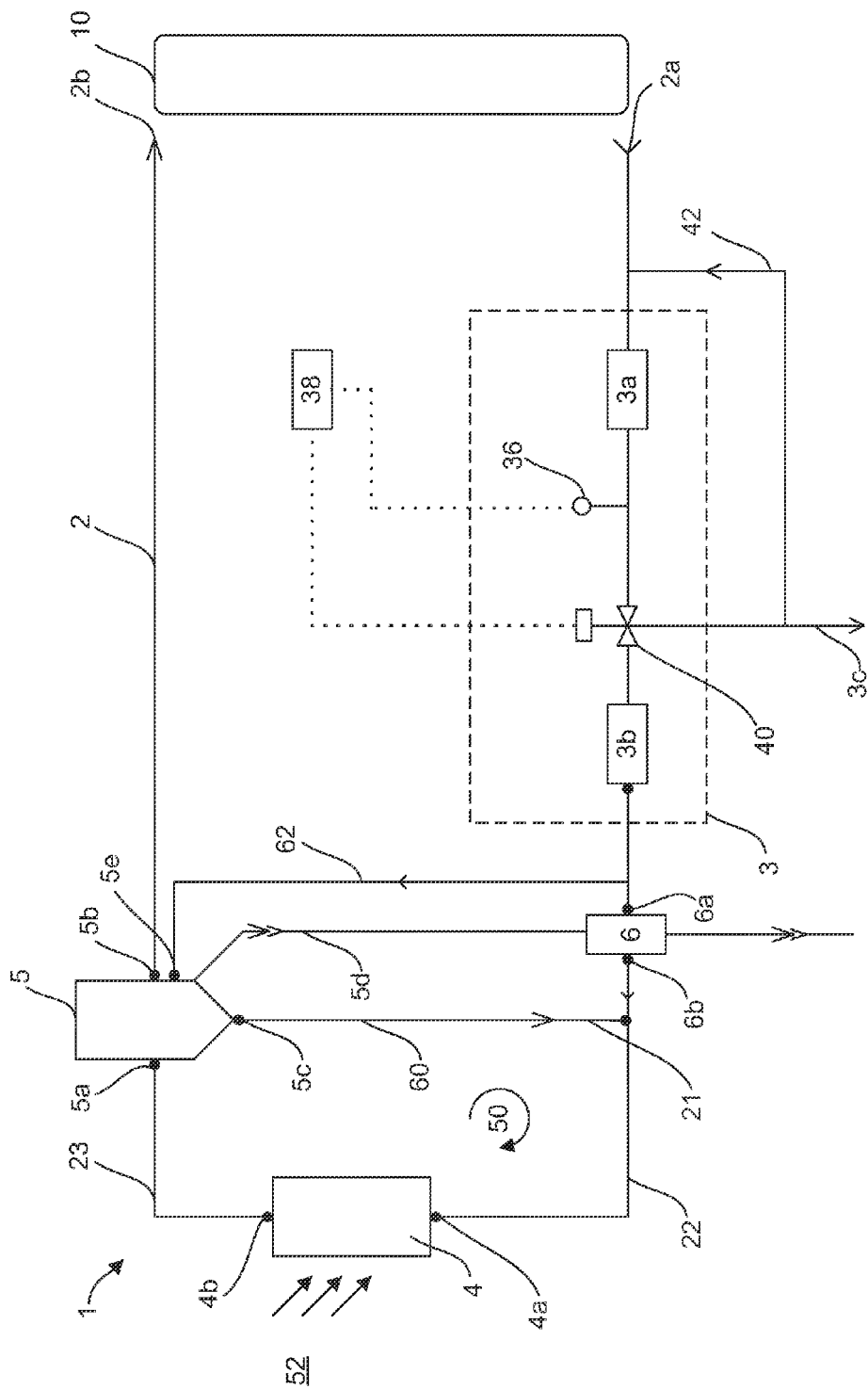
FIG. 2 is a schematic illustration of a steam supply apparatus according to an alternative embodiment of the invention.

FIG. 2 illustrates a second embodiment where components the same as in FIG. 1 are numbered consistently with FIG. 1. FIGS. 1 and 2 show two alternative fluid connections of the water inlet 2a to the solar heat system 4. In FIG. 1, the water inlet 2a is indirectly in fluid communication with the solar heat system 4 via a separator 5, while in FIG. 2, the water inlet 2a is directly in fluid communication with the solar heat system 4.

As shown in FIG. 1, the water buffer 3b may be integrated with the water purification facility 3. Water from the water buffer 3b is supplied to a circulating part (21,22,23) of the circuit 2 via a separator 5 via an auxiliary separator inlet 5e. The circulating part of the circuit 2 is formed by the recirculation conduit 21 and an extension conduit 22 connected to the solar heat system and an intermediate conduit 23 forming a connection from the solar heat system 4 to the separator 5. The recirculation and extension conduit 21, 22 may be arranged as a single conduit 21,22 which extends from the separator 5 to the solar heat system. The water which is supplied via the auxiliary separator inlet 5e mixes with a volume of water in the separator 5 before the water volume is conducted through the circulating part of circuit 2. Advantageously, the mixing compensates at least partially a thermal difference between supplied water and present water in the circuit. Should contaminated water be found in the water buffer, it may be drained away before the water enters the circuit. Alternatively, the water buffer 3b may be integrated with the separator 5, or it may be provided as a stand alone unit.

In FIG. 2, water from the water buffer 3b of the water purification facility 3 is directly conducted to the solar heat system 4. The water passes through a pre-heater 6 before entering the solar heat system via a heat system inlet 4a. The pre-heater 6 is arranged for preheating feed water flowing to the water heater. The pre-heater 6 is positioned upstream the solar heat system 4. The pre-heater 6 has a pre-heater inlet 6a which is in fluid communication with the purification facility and a pre-heater outlet 6b which is in fluid communication with the solar heat system. The separator 5 of the solar plant 1 has a blowdown outlet 5d for a blowdown flow for discharging contaminated or excess water. Alternatively, the discharging conduit is the recirculation conduit 21. Discharged water from the separator 5 has a relatively high temperature. The discharging conduit 5d is connected to the pre-heater to transfer residual heat from the blowdown flow to the purified water passing from the water treatment apparatus to the water heater 4. Advantageously, the water from the water inlet 2a is preheated, thermal disturbances are reduced, and the efficiency of the solar plant is increased.

The water steam circuit disclosed herein is a single circuit, wherein water from the water inlet is directly fed through the solar heat system. The water may be conducted through a heat exchange panel of the solar heat system, wherein the water is directly heated by insolation. The solar plant avoids the necessity for first and second subcircuits which are coupled by a heat exchange unit to prevent returned water to flow through the heat system as are required in the art. The recirculation conduit provides an advantage in comparison with a circuit without the recirculation conduit, since the mass flow rate of water through the heat system is increased, thereby decreasing the size of bubbles formed on the heat exchange surface, thereby reducing the localized formation of scale on the surface. The solar heat system is of a circulating type instead of a once through type. Water circulates through the solar heat system and generated steam is separated from the water and discharged via the steam outlet by the separator.

The recirculation conduit conducts separated water from the separator to the heat system inlet. The separated water from the separator is fed to the heat system together with water originating from the water inlet of the water steam circuit. The water inlet of the circuit is a first water source and the separator water outlet is a second water source for the solar heat system. Advantageously, the controllability of the water quality fed to the heat system is improved by feeding the solar heat system from two water sources. A total mass flow of water which is fed to the solar heat system originates from the two water sources, in which the ratio between a first mass flow of water from the first water source and a second mass flow of water from the second water source is controllable. In case that a contamination is detected in the first mass flow, it is possible to reduce the first mass flow to prevent damage to the solar heat system.

In an embodiment of the solar plant according to the invention, returned water from the object is recycled in the steam water circuit. In dry regions, such as desserts, the availability of sunlight is generally high, but the availability of water is generally low. For that reason, it is advantageous to install the disclosed apparatus at such regions and to recycle the water.

In an embodiment, monitoring and control means are provided to control the mass flow rate from the separator water outlet and/or the mass flow rate of water originating from the water inlet. If it is monitored that the water flow from the water inlet of the circuit is contaminated above an admissible level, it is possible to control the concentration of contaminations in the water flow to the solar heat system by controlling the ratio of fed water from the recirculation conduct with respect to the fed water originating from the water inlet. In particular, the separator may serve as a water buffer for compensating variations is mass flow, and thus the solar heat system can be protected against contaminations in the water which pass through the solar heat system.

In an embodiment of the solar plant, the solar plant may be implemented in an industrial plant e.g. a refinery for metals, salt, sugar, oil, gas etc. The solar plant is particularly advantageous in a solar enhanced oil recovery (EOR) plant. The solar EOR plant includes a steam injection well for injecting steam into an oil field and an oil well for receiving oil from the oil field. The steam outlet of the circuit is connected to the steam injection well and the water inlet of the circuit is connected to the oil well. The steam outlet may be connected to a steam injection well. The steam outlet may be arranged for injecting steam into the formation. The water inlet may be connected to a water-oil separator for separating water from oil originating from the oil field. Water is separated from yielded oil and returned back into the water steam circuit.

In an embodiment of the invention, incident solar radiation may be used to heat a heat exchange tube of the solar heat system. The heat exchange tube conducts the water steam mixture and is part of the water steam circuit. Herewith, the incident sunlight directly heats the water steam mixture. No further heat transfer to another circuit by heat exchangers is necessary to obtain the steam which is discharged through the steam outlet. Thermal losses caused by heat exchange units are prevented. Due to the direct heat of water in the circuit which takes place in one step, a higher efficiency of the solar plant may be achieved. The start up time of the solar plant is decreased and thus the available operational time of the solar plant is increased. Additionally, the capital investment to implement the solar plant is reduced.

In an embodiment of the invention, the solar plant includes a water purification facility which is provided at the water inlet for cleaning water, in particular returned water from the object and for feeding purified water to the water steam circuit. The water purification facility has a water buffer for storing water originating from the object. Returned water is first purified before it is stored in the water buffer. The water buffer is in fluid communication connected to the water inlet of the water steam circuit. Water is fed from the water buffer to the water steam circuit. Advantageously, the water buffer serves as a back up facility for cleaned water. If a contamination of returned water is above an admissible level, the water buffer provides a reduction of the concentration of the contamination. Additionally, the water buffer provides a delay time before the contaminated water enters the water steam circuit. During the delay time, an operator has an opportunity to repair a malfunction of the purification facility. Additionally, the implementation of the water buffer only requires a limited capital investment to obtain a purification facility which complies to higher purification requirements.

In an embodiment of the invention, the water purification facility has a monitoring means to detect an inadmissible contamination of water, in particular of supplied water to the water buffer. In particular, the monitoring means may be real time monitoring means which are on-line and connected to a control unit. Advantageously, a failure of the water purification facility is thus detected at it occurs. The earlier detection of the purification failure limits the amount of contaminated water flowing into the water steam circuit, and less contaminated water flowing into the solar heat system will reduce its contamination.

In an embodiment of the invention, the water purification facility has a purification device including a drain outlet to drain contaminated water away from the water buffer. Advantageously, contaminated returned water can be drained away before it is entered into the water buffer. The water buffer may have shut off means e.g. a stop valve to close a passage from the purification device to the water buffer.

In an embodiment of the invention, the solar plant includes a pre-heater for preheating fed water. The pre-heater is positioned upstream the solar heat system. The pre-heater may have a pre-heater outlet which is in fluid communication with the solar heat system and a pre-heater inlet which is in fluid communication with the purification facility. The separator of the solar plant may have a blowdown conduit for discharging contaminated water. Discharged water from the separator has a relatively high temperature. The blowdown conduit may be connected to the pre-heater to transfer residual heat from the separator via the blowdown conduit to the pre-heater. Advantageously, the efficiency of the solar plant may be further increased by the implementation of the pre-heater.

In an embodiment of the invention, the solar heat system is a point focussing system where sunlight is reflected to a point. The point focussing system includes a field of heliostats for reflecting solar radiation and a solar tower for receiving reflected solar radiation from the heliostats. The solar heat system includes an evaporator and a solar tower, wherein the evaporator is mounted on the solar tower. The evaporator includes a receiver panel for receiving incident solar radiation. The receiver panel includes at least one set of heat transfer tubes. The separator of the solar plant may also be mounted on the solar tower. The heat transfer tubes are oriented in an upwards direction, in particular a vertical direction. Advantageously, the upwards directed heat transfer tubes are less susceptible to malfunction and disturbances caused by rising steam. The heat transfer tubes of a solar panel are in fluid communication connected to each other by a header. The solar panel has at least one connector for a chemical cleaning of the inside of the solar panel for removing particles due to scaling. Chemical cleaning is a cleaning process wherein heat exchange tubes are flushed with a chemical solution. In chemical cleaning a cleaning agent is used to clean the heat exchange tubes. In particular, chemical cleaning is acid-cleaning. Minerals and silicates solve into the solution and are removed from the metal surfaces of the heat exchange tubes. The connectors may be permanent connectors which are permanently available at the solar panel. Advantageously, chemical cleaning instead of the commonly known mechanical technique of launching of a pig results in a simplified configuration of the solar panel.

In an embodiment of the invention, the solar heat system is a point focusing system comprising a field of heliostats and a solar tower for receiving reflected solar rays from the heliostats, wherein the solar tower has an evaporator comprising at least one solar heat exchange panel to receive incident solar radiation to evaporate fed water. The separator is designed to allow high thermal loads to about 600 kW/m$^2$. The evaporator is of a circulating type, such that supplied water passes several times through the evaporator. Hence, instead of a once through type evaporator, the evaporator is of a circulating type. The evaporator comprises an evaporator separator which is in fluid communication connected to at least one evaporator panel, wherein an evaporator separator water outlet is connected to a supply conduit of the at least one evaporator panel. Advantageously, the circulation provides less thermal load and reduces a risk of scaling.

A method for generating steam is disclosed herein, in particular for carrying out a tertiary Enhanced Oil Recovery (EOR) including the steps of providing a solar plant as described herein and operating the solar plant. In the method, a ratio between a mass flow rate of supplied water to the solar heat system originating from the separator which is fed by the recirculation conduit and a mass flow rate of supplied water originating from the water inlet of the circuit is at least a factor five. A ratio of a factor five provides a positive effect in that the solar heat system gets less contaminated. In particular the ratio of mass flow rates is at least a factor 5, more in particular at least a factor 8 and preferably at least a factor 10, thereby a negative effect of contamination in the supplied water from the water inlet on the evaporator of the solar heat system is reduced. Contamination of the supplied water from the water inlet may e.g. be minerals which tend to stick and cook to the inside of the evaporator. This form of contamination is known as scaling. Due to an enlarged mass flow rate through the evaporator, the evaporator of the solar heat system is less susceptible to contamination.

Generated steam is fed to an object and water is extracted from the object to return the obtained water in the solar plant. Water is recycled which is advantageous in dry regions. Purified water at the water inlet of the water steam circuit is stored in a water buffer of the purification facility or separator or separately before supplying the water to the circuit. The storage of purified water provides a delay time before the water enters the water steam circuit of the solar plant. The delay time can be used by an operator to repair a malfunction of the water purification facility.

In an embodiment of the invention, the amount of contamination of water of the purification facility is monitored on line and real time. In particular, the quality of water which is supplied to the water buffer is monitored, and a timely alert is generated in case and that supplied water contains too much contamination. In the event that contaminated water is detected by the monitoring means, the method may include a step wherein the water buffer inlet is shut off from an outlet of a purification device of the purification facility. The water buffer outlet may remain open to the water steam circuit, such that the water steam circuit is still fed by the water buffer.

During the lifetime of the solar plant, the solar heat system may need to be cleaned. Contamination such as minerals in the supplied water may have caused scaling of the evaporator. The method may include a step wherein a chemical cleaning is used to clean the evaporator of the solar heat system. In particular, the chemical cleaning may be acid-cleaning. A suitable solution including chemical ingredients is flushed through the evaporator to solve cooked minerals and silicates and remove them from the evaporator. Advantageously, by using a chemical cleaning process, the configuration of the evaporator may be relative simple in comparison with a mechanical cleaning in which a launch station and receiving station for a pig is necessary.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A steam supply apparatus for enhanced oil recovery comprising:
   a water treatment apparatus comprising an inlet for receiving contaminated water from an oil field and an outlet for providing purified water;
   a water circulating apparatus for receiving the purified water and for providing steam for injection into the oil field;
   the water circulating apparatus further comprising:
      a water heater comprising a water inlet and a water/steam outlet; and
      a separator comprising a water/steam inlet in fluid communication with the water heater water/steam outlet, a steam outlet for providing the steam for injection into the oil field, and a water outlet in fluid communication with the water heater water inlet;

a buffer having an inlet and outlet and defining a volume in fluid communication between the water treatment apparatus and the water heater, the buffer volume sized to be effective to maintain purified water flow to the water heater for a predetermined time period in the event a valve is closed between the water treatment apparatus and the buffer volume, terminating flow of purified water from the water treatment apparatus, the buffer volume being a predetermined time lag multiplied by a water production by the water treatment apparatus at its rated capacity;

a blowdown outlet from the separator for communicating a blowdown flow; and a pre-heater in fluid communication with the blowdown flow and the water outlet from the water treatment apparatus for heat exchange there between, wherein the pre-heater is downstream of the blowdown flow, the buffer volume, and the water outlet from the water treatment apparatus.

2. The apparatus of claim 1, wherein the buffer volume being at least equal to one hour of water production by the water treatment apparatus at its rated capacity.

3. The apparatus of claim 1, wherein the water treatment apparatus provides the purified water to the water heater through the separator, and the buffer volume is formed to be integral with the separator.

4. The apparatus of claim 1, wherein the buffer volume is formed to be integral with the water treatment apparatus with the pre-heater and heater down-stream of the water treatment apparatus.

5. The apparatus of claim 1, further comprising:
a water quality monitor operative to provide an output responsive to quality of the purified water; and
a control system receiving the water quality monitor output and operative to terminate operation of the water heater if the purified water quality is below a threshold for a predetermined time interval.

6. The apparatus of claim 1, wherein the water heater comprises a solar heater.

7. The apparatus of claim 1, configured such that a circulating flow rate of water from the separator water outlet to the water heater inlet is higher than a flow rate of the purified water from the water treatment apparatus to the water circulating apparatus.

8. A steam supply apparatus for enhanced oil recovery comprising:
a water circulating portion comprising a loop operative to provide a continuous flow of water to a water heater for the production of a mixture of steam and water, and a separator, operative for separating steam from water and for directing the steam to a well;
a water treatment portion operative to purify water received from the well and to provide purified water to the water circulating portion;
a buffer having an inlet and outlet and defining a volume in fluid communication between the water treatment portion and the water circulating portion, the buffer volume sized to provide a predetermined time lag between an instance of an unacceptable degradation of quality of the purified water produced by the water treatment portion and an occurrence of an unacceptable scale production in the water heater in the event a valve closes between the water treatment portion and the buffer volume, terminating flow of purified water from the water treatment portion, the buffer volume being a predetermined time lag multiplied by a water production by the water treatment portion at its rated capacity;
a blowdown outlet from the separator for conveying blowdown fluid; and
a pre-heater operative to transfer heat from the blowdown fluid to the purified water provided to the water circulating portion.

9. The apparatus of claim 8, further comprising:
a water quality apparatus measuring a quality parameter indicative of quality of the purified water; and
a control system operative to control operation of the water circulating portion responsive to the quality parameter.

10. The apparatus of claim 8, further comprising:
a means for monitoring quality of the purified water being produced by the water treatment portion; and
a control system operative to close a valve disposed between the water treatment portion and the buffer volume upon detection of an unacceptable quality of the purified water being produced by the means for monitoring quality, such that the water circulating portion continues to be supplied with purified water from the buffer volume.

11. The apparatus of claim 8, wherein a rate of flow of the continuous flow of water to the water heater is higher than a rate of flow of the purified water from the water treatment portion to the water circulating portion.

12. The apparatus of claim 8, wherein the buffer volume comprises a volume capacity of at least one hour of purified water production by the water treatment portion at a rated capacity.

13. The apparatus of claim 8, wherein the buffer volume is formed to be integral with the separator, wherein the pre-heater is downstream of the blowdown outlet of the separator with integral buffer volume.

14. The apparatus of claim 8, wherein the water heater comprises a solar heater.

15. A steam supply apparatus for enhanced oil recovery comprising:
a water circulating portion comprising a loop operative to provide a continuous flow of water to a water heater for the production of a mixture of steam and water, and a separator, operative to separate steam from water, and for directing the steam to a well;
a water treatment portion operative to purify water received from the well and to provide purified water to the water circulating portion;
a valve operable to terminate flow of purified water from the water treatment portion to the water circulation portion;
a buffer having an inlet and outlet and defining a volume in fluid communication between the water treatment portion and the water circulating portion, the buffer volume sized to provide a predetermined time lag between an instance of an unacceptable degradation of quality of the purified water produced by the water treatment portion and an occurrence of an unacceptable scale production in the water heater in the event the valve closes between the water treatment portion and the buffer volume, terminating flow of purified water from the water treatment portion, the buffer volume being a predetermined time lag multiplied by a water production by the water treatment portion at its rated capacity;
a means for monitoring quality of the purified water being produced by the water treatment portion; and
a control system operative to close the valve disposed between the water treatment portion and the buffer volume upon detection of an unacceptable quality of the purified water being produced, such that the water circulating portion continues to be supplied with purified water from the buffer volume.

\* \* \* \* \*